Nov. 2, 1926. 1,604,964
W. M. BRADSHAW ET AL
REGULATOR SYSTEM
Filed Sept. 22, 1923     3 Sheets-Sheet 1

WITNESSES:
A.J.Butler.

INVENTORS
William M. Bradshaw, &
John H. Ashbaugh.
BY
ATTORNEY

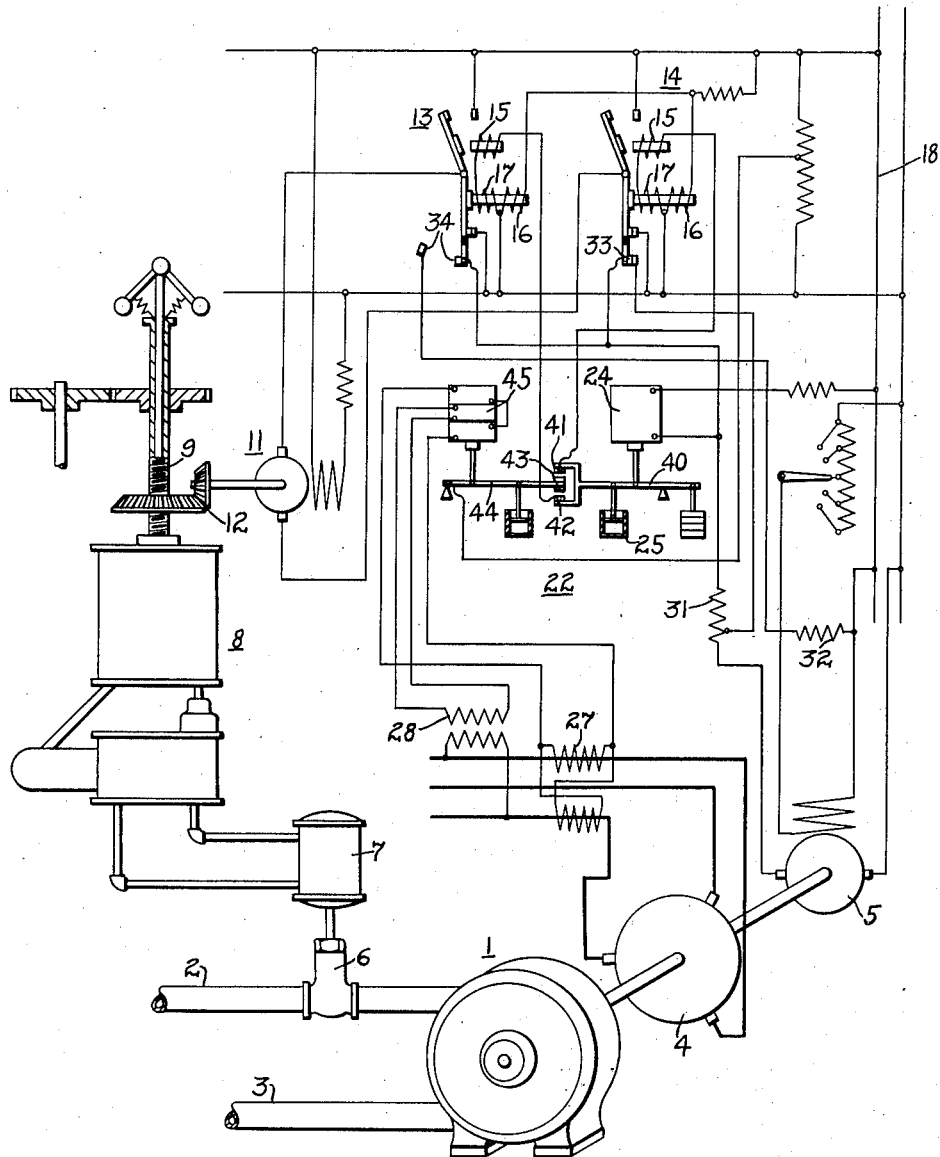

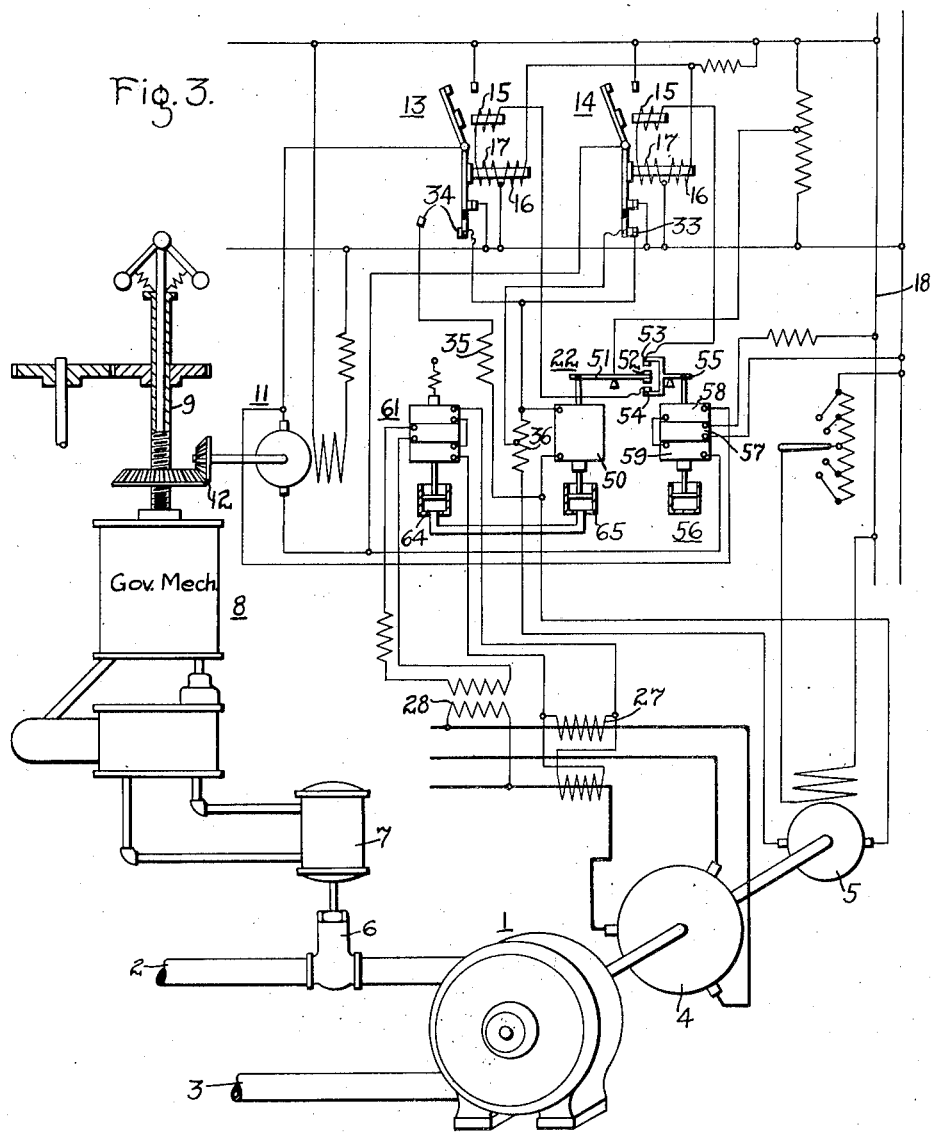

Patented Nov. 2, 1926.

1,604,964

UNITED STATES PATENT OFFICE.

WILLIAM M. BRADSHAW AND JOHN H. ASHBAUGH, OF WILKINSBURG, PENNSYLVANIA, ASSIGNORS TO WESTINGHOUSE ELECTRIC & MANUFACTURING COMPANY, A CORPORATION OF PENNSYLVANIA.

REGULATOR SYSTEM.

Application filed September 22, 1923. Serial No. 664,200.

Our invention relates to speed-regulator systems, and it has particular relation to regulator systems for governing the operation of hydraulic prime movers.

One object of our invention is to provide a system of the above-indicated character that shall be responsive not only to changes in speed, but upon which variations in load will become effective prior to effects caused by such load variations upon the speed of the prime mover.

Another object of our invention is to provide a system of the above-indicated character with efficient anti-hunting means.

In controlling a prime mover that is connected to an electric generator, it is desirable to maintain the speed of the prime mover substantially constant, which is accomplished through the aid of appropriate regulating mechanism. In the present instance, an electrical regulator has been illustrated as controlling a governor motor. It is also desirable to provide means to co-operate with said regulator to affect the operation thereof in accordance with the load variations upon the generator, prior to a change in speed of the water-wheel, so that the load variations will be compensated for prior to the normal operation of the water-wheel and associated mechanism.

The present invention contemplates providing a regulator actuated in accordance with the speed of the prime mover and an electromagnet that is hydraulically connected to said regulator and that is controlled in accordance with the load upon the generator. At times, it may become desirable to provide anti-hunting means that is operated in accordance with the counter-electromotive force of the controlled motor.

In the accompanying drawings,

Fig. 2 is a diagrammatic illustration of circuits and apparatus embodied in a modification of the system of Fig. 1; and Fig. 3 is a diagrammatic illustration of the circuits and apparatus of the system of Fig. 1, using additional anti-hunting means.

Figure 1:
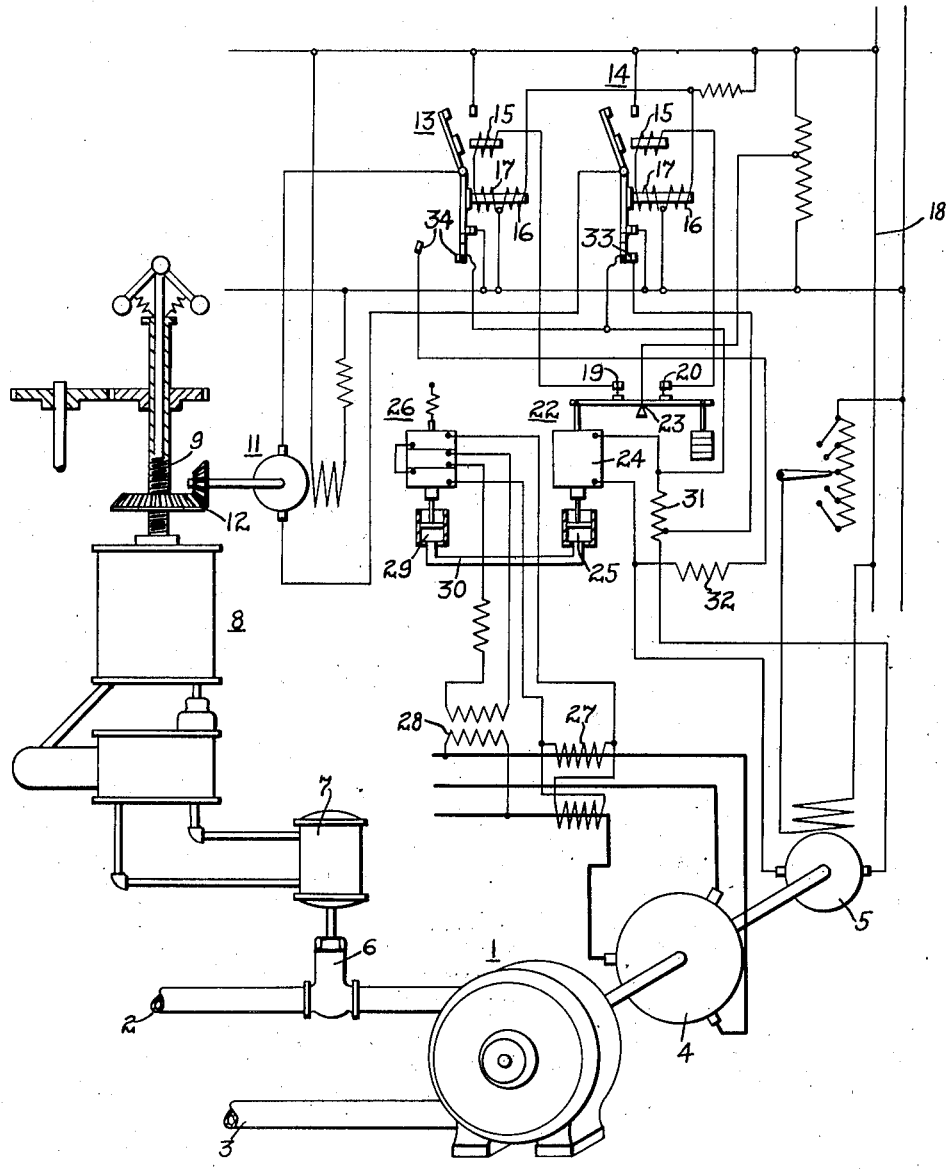
Figure 1 is a diagrammatic illustration of the circuits and apparatus included in one embodiment of our invention.

Referring to Fig. 1, a water-wheel 1, having an inlet 2 and an outlet 3, has directly connected thereto a generator 4. Mounted upon the shaft of the water-wheel is an auxiliary generator 5.

A hydraulically-operated valve 6 governs the supply of water to the water-wheel. The actuating mechanism 7 for the valve 6 may be controlled by any well-known governor mechanism 8, the operation of which is governed by a shaft 9. The shaft 9 is operated by a motor 11 through illustrated gearing 12 to control the setting of the governor mechanism 8. The direction of rotation of the motor 11 is controlled by reversing switches 13 and 14, each of which comprises an operating coil 15, a holding coil 16 and a neutralizing coil 17 that are connected to bus bars 18 through contact members 19 and 20, respectively, of the illustrated floating-lever type regulator 22. The circuits to the contact members 19 and 20 are governed by the regulator 22, which comprises a pivoted beam 23, upon which is pivotally mounted a speed-responsive electromagnet 24 that is energized from the auxiliary generator 5. The electromagnet 24 has co-operating therewith a dash-pot 25.

A second or load-responsive electromagnet 26 is provided and is adapted to be energized in accordance with the load or wattage of the main generator 4, through the agency of series transformers 27 and voltage transformers 28. The load-responsive electromagnet 26 has a dash-pot 29 co-operating therewith that is hydraulically connected to the dash-pot 25 by means of a pipe 30.

The operation of the system of Fig. 1 is substantially as follows: If there is a variation in speed of the water-wheel 1, such variation affects the voltage delivered by the generator 5 to the speed-responsive electromagnet 24 to cause it to close either contact members 19 or contact members 20 and complete the circuit to the appropriate reversing switch 13 or 14 to operate the motor 11. The operation of the motor 11 will vary the setting of the governor mechanism and correspondingly raise or lower the valve 6 to increase or decrease the supply of water to the water-wheel 1.

Hunting of this portion of the mechanism is prevented by means of resistors 31 and 32. The resistor 31 is in circuit with auxiliary contact members 33 that are carried by the reversing switch 14 and are normally closed, so that the resistor 31 is normally shunted from the circuit of the electromagnet 24. The resistor 32 is in circuit with auxiliary contact members 34 that are carried by the reversing switch 13 and are normally open, so that the resistor 32 is normally excluded from the circuit of the electromagnet 24. When the reversing switch 14 operates, contact members 33 will be opened, thereby inserting the resistor 31 in circuit with the electromagnet 24 to decrease the ampere-turns and, accordingly, the pull thereof. When reversing switch 13 operates, the contact members 34 will be closed to insert the resistor 32 in parallel circuit relation to the coil of the electromagnet 24, thereby decreasing the ampere-turns thereof.

It is also desirable to actuate the regulator mechanism in accordance with load variations upon the generator 4 so that, if the load change is large, the regulator mechanism will be actuated promptly to compensate for the load change before an actual change in speed occurs. The load-responsive electromagnet 26 is actuated in accordance with the wattage delivered by the generator 4 and controls the piston of the dash-pot 29. Upon a variation in load, the electromagnet 26 will be moved and the dash-pot 29 correspondingly affected. The increased or decreased pressure in the other dash-pot 25 will actuate the piston of the dash-pot and also the regulator mechanism through which it works. If the load change is large or sudden, the electromagnet 26 will actuate the regulator 22 in the manner described, but, as the load is gradually corrected, the electromagnet 26 will be restored to its normal position and, at the same time, the pressure in the dash-pots will become equalized.

Referring to Fig. 2, in so far as the systems are similar, the same reference characters are used as in the system of Fig. 1. In Fig. 2, the regulator 22 comprises a pivoted lever 40 having one end thereof forked so as to carry contact members 41 and 42. Contact members 41 and 42 co-operate with a normally stationary contact member 43 that is mounted upon a pivoted lever or arm 44. The lever 44 has co-operating therewith an electromagnet 45 that is similar in construction and operation to the electromagnet 26.

In the system of Fig. 2, the control or speed-responsive electromagnet 24 of the regulator is rendered considerably more sensitive by reason of the fact that the electromagnet 24 is not only connected to the generator 5 but also to the bus bars 18.

Anti-hunting is accomplished in the manner described in connection with the system of Fig. 1.

The operation of the system of Fig. 2 is substantially similar to that of Fig. 1, and it is believed that no detailed description thereof is necessary. In the system of Fig. 2, the electromagnet 45 actuates the arm 44 and the contact members 43 so that, upon a variation in load, the appropriate contact members (such as 41 and 43) will be engaged to operate the governor motor 11 to control the setting of the governor mechanism 8.

In so far as the system of Fig. 3 is similar to the system of Fig. 1, like reference numerals have been used. The principal differences are in the regulator mechanism 22. In Fig. 3, the operation of the regulator is governed by a speed-responsive electromagnet 50 that is connected to a pivoted lever 51 carrying contact members 52. The contact members 52 co-operate with contact members 53 and 54 that are respectively in circuit with the operating coils of the reversing switches 13 and 14. The contact members 53 and 54 are carried by a forked lever arm 55, the position of which is governed by an electromagnet 56.

The electromagnet 56 comprises a coil 57 that is connected across the bus bars 18 and two oppositely disposed coils 58 and 59 that are connected across the governor motor 11 so that the electromagnet 56 is controlled in accordance with the counter-electromotive force of the motor 11 and is thus sensitive to the direction of the counter-electromotive force. The operation of the electromagnet 56 is so proportioned as to separate the engaged contact members just prior to the obtaining of normal speed conditions of the prime mover.

The regulator 22 is also governed in accordance with variations in load through the action of an electromagnet 61 that is energized from the transformers 27 and 28, the electromagnet being hydraulically connected to the electromagnet 50 through the connected dash-pots 64 and 65. The auxiliary contact members 33 and 34 of the reversing switches control the resistors 35 and 36 that are in circuit with the coil of the electromagnet 50 in the same manner and for the same purposes as the resistors 31 and 32 of Fig. 2.

The operation of the system of Fig. 3 is similar to that described for the systems of Figs. 1 and 2 except that an additional anti-hunting means is provided to insure premature separation of the engaged contact members regardless of the operation of the regulator to correct for a speed change or a load change.

Upon the energization of the motor 11 the counter electromotive force of the motor energizes the magnet 56 in a direction that will swing the forked lever 55 in a direction tending to move the engaged contact 53 or 54 away from the contact 52. The direction of the energization of the magnet 56 depends on the direction of the counter electromotive force of the motor 11. The electromagnet 56 together with the anti-hunting resistors 31 and 32 co-operate to produce a sensitive device for separating the engaged contact members just prior to the obtaining of normal speed conditions of the motor.

Modifications in the system and arrangement and location of parts may be made within the spirit and scope of our invention, and such modifications are intended to be covered by the appended claims.

We claim as our invention:—

1. The combination of a prime mover, an electric generator driven thereby, a valve for controlling said prime mover, means for actuating said valve, an electric motor for controlling the actuating means, electromagnetic load-responsive means and electromagnetic speed-responsive means controlling the operation of the motor and means actuated upon the operation of said motor for controlling means for varying the magnetization of the speed-responsive means to prevent hunting action.

2. The combination of a prime mover, an electric generator driven thereby, a valve for controlling said prime mover, means for actuating said valve, an electric motor for controlling the valve-actuating means, load-responsive means and electromagnetic speed-responsive means for controlling the operation of the motor and means actuated upon the operation of said motor controlling means for modifying the magnetization of the speed-responsive means to prevent hunting action.

3. The combination of a prime mover, an electric generator driven thereby, a valve for controlling said prime mover, means for actuating said valve, an electric motor for controlling the actuating means, motor-control means, load-responsive means and electromagnetic speed-responsive means for operating the motor-control means and anti-hunting means comprising resistors adapted for increasing or decreasing the magnetization of the speed-responsive device to cause the same to resume its normal position just prior to the establishment of normal speed.

4. The combination of a prime mover, an electric generator driven thereby, a valve for controlling said prime mover, means for actuating said valve, an electric motor for controlling the actuating means, contact elements for controlling the operation of the motor, electromagnetic load-responsive means and electromagnetic speed-responsive means for operating the contact elements, and anti-hunting means modifying the magnetization of the speed-responsive means to advance the time of opening said contact elements.

5. The combination of a prime mover, an electric generator driven thereby, a valve for controlling said prime mover, means for actuating said valve, an electric motor for controlling the actuating means, floating contact elements for controlling the operation of the motor, co-operating electromagnetic load-responsive means and electromagnetic speed-responsive means for controlling the contact elements, and anti-hunting means therefor comprising resistors connected in circuit with said electromagnetic speed-responsive means to partially counteract an increase or decrease in the ampere turns thereof.

6. The combination of a prime mover, a valve for controlling the prime mover, controlling mechanism therefor, a motor for actuating said mechanism, electromagnetic load-responsive means and electromagnetic speed-responsive means for co-operatively controlling said motor, and means for preventing hunting action in the system by modifying the magnetization of the speed-responsive means.

7. The combination of a prime mover, a valve for controlling the prime mover, controlling mechanism therefor, a motor for actuating said mechanism, electromagnetic load-responsive means and electromagnetic speed-responsive means for co-operatively controlling said motor, and means for preventing hunting action in the system comprising resistors for modifying the magnetization of the speed-responsive means.

8. The combination of a prime mover, a valve for controlling the prime mover, controlling mechanism therefor, a motor for actuating said mechanism, electromagnetic load-responsive means and electromagnetic speed-responsive means for co-operatively controlling said motor, and means for preventing hunting action in the system comprising resistors adapted to be connected in circuit to limit the change in magnetization of the speed-responsive means.

9. The combination of a prime mover, a valve for controlling the prime mover, controlling mechanism therefor, a motor for actuating said mechanism, electromagnetic load-responsive means and electromagnetic speed-responsive means for co-operatively controlling said motor, and means for preventing hunting action in the system comprising a plurality of resistors adapted to be connected in series relation with and in parallel relation to said electromagnetic speed-responsive means.

10. The combination of a prime mover, a valve for controlling the prime mover, controlling mechanism therefor, a motor for actuating said mechanism, electromagnetic load-responsive means for controlling the motor, comprising a coil having a movable armature and a dash-pot co-operating therewith, electromagnetic speed-responsive means for controlling the motor comprising a coil having a movable armature and a dash-pot co-operating therewith, and means co-operatively relating the action of the load-responsive means and the speed-responsive means.

11. The combination of a prime mover, a valve for controlling the prime mover, controlling mechanism therefor, a motor for actuating said mechanism, electromagnetic load-responsive means for controlling the motor, electromagnetic speed-responsive means for controlling the motor comprising a coil having a movable armature and a dash-pot co-operating therewith, and means co-operatively relating the action of the load-responsive means and the speed-responsive means.

12. The combination of a prime mover, a valve for controlling the prime mover, controlling mechanism for the valve, a motor for actuating said mechanism, electromagnetic load-responsive means for controlling the motor, electromagnetic speed responsive means for controlling the motor, and means co-operatively relating the action of the load-responsive means and the speed-responsive means.

13. The combination of a prime mover, a valve for controlling the prime mover, controlling mechanism therefor, a motor for actuating said mechanism, electromagnetic load-responsive means and electromagnetic speed-responsive means co-operating to control the motor, means for modifying the magnetization of the speed-responsive means to prevent hunting in the system, and additional anti-hunting means responsive to the counter electromotive force of the motor.

14. The combination of a prime mover, a valve for controlling the prime mover, controlling mechanism therefor, a motor for actuating said mechanism, electromagnetic load-responsive means and electromagnetic speed-responsive means co-operating to control the motor, means for modifying the magnetization of the speed-responsive means to prevent hunting in the system, and additional anti-hunting means comprising an armature and a co-operating electromagnetic coil.

15. The combination of a prime mover, a valve for controlling the prime mover, controlling mechanism therefor, a motor for actuating said mechanism, electromagnetic load-responsive means and electromagnetic speed-responsive means co-operating to control the motor, and anti-hunting means comprising a movable armature, a permanently energized coil therefor and a second coil therefor energized in accordance with the counter electromotive force of the motor.

16. The combination of a prime mover, a valve for controlling the prime mover, controlling mechanism therefor, a motor for actuating said mechanism, electromagnetic load-responsive means and electromagnetic speed-responsive means co-operating to control the motor, and anti-hunting means comprising an electromagnet having a constantly energized coil and a coil energized in accordance with the electromotive force of the motor, a movable armature and a dash-pot therefor.

17. The combination of a prime mover, a valve for controlling the prime mover, controlling mechanism therefor, a motor for actuating said mechanism, a regulator device for controlling the motor comprising movable contact elements, co-operating load-responsive means and speed-responsive means for adjusting certain of said contact elements, a plurality of other contact elements, and electromagnetic means for adjusting said other contact elements to co-operate with the first-mentioned contact elements to prevent hunting in the system.

18. The combination of a prime mover, a valve for controlling the prime mover, controlling mechanism therefor, a motor for actuating said mechanism, a regulator device for controlling the motor comprising movable contact elements, co-operating load-responsive means and speed-responsive means for adjusting certain of said contact elements, a plurality of other contact elements, and electromagnetic means for adjusting said other contact elements to co-operate with the first-mentioned contact elements to prevent hunting in the system, said electromagnetic adjusting means comprising a movable armature and coils for actuating the armature.

19. The combination of a prime mover, a valve for controlling the prime mover, controlling mechanism therefor, a motor for actuating said mechanism, a regulator device for controlling the motor comprising movable contact elements, co-operating load-responsive means and speed-responsive means for adjusting certain of the contact elements, a plurality of other contact elements, and electromagnetic means for adjusting said other contact elements to co-operate with the first-mentioned contact elements to prevent hunting in the system, said electromagnetic adjusting means comprising a movable armature and coils for actuating said armature, certain of said coils being actuated in accordance with the counter electromotive force of the motor.

20. The combination of a prime mover, a valve for controlling the prime mover, controlling mechanism therefor, a motor for actuating said mechanism, regulator means for controlling the motor, load-responsive means and electromagnetic speed-responsive means co-operating to actuate the regulator means and anti-hunting means adapted to modify the magnetization of the electromagnetic speed-responsive means.

21. The combination of prime mover, a valve for controlling the prime mover, controlling mechanism therefor, a motor for actuating said mechanism, regulator means for controlling the motor, load-responsive means and electromagnetic speed-responsive means co-operating to actuate the regulator means, anti-hunting means adapted to modify the magnetization of the electromagnetic speed-responsive means, and additional anti-hunting means adapted to modify the period of actuation of the regulator means.

22. The combination of a prime mover, a valve for controlling the prime mover, controlling mechanism therefor, a motor for actuating said mechanism, regulator means for controlling the motor, load-responsive means and electromagnetic speed-responsive means co-operating to actuate the regulator means, anti-hunting means adapted to modify the magnetization of the electromagnetic speed-responsive means, additional anti-hunting means adapted to modify the period of actuation of the regulator means, said second-mentioned anti-hunting means comprising an electromagnet having a movable armature and a dash-pot co-operating therewith.

23. The combination of a prime mover, a valve for controlling the prime mover, controlling mechanism therefor, a motor for actuating said mechanism, regulator means for controlling the motor, load-responsive means and electromagnetic speed-responsive means co-operating to actuate the regulator means, anti-hunting means adapted to modify the magnetization of the electromagnetic speed-responsive means, a constant potential source of energy, additional anti-hunting means adapted to modify the period of actuation of the regulator means, said second-mentioned anti-hunting means comprising an electromagnet having a movable armature and a dash-pot co-operating therewith, the electromagnet being energized in part from said constant potential source, and in part in accordance with the counter electromotive force of the motor, and being sensitive to the direction of the counter-electromotive force.

24. In a regulating system, the combination of a prime mover, a valve for controlling the prime mover, controlling mechanism therefor, a motor for actuating said mechanism, load-responsive means and electromagnetic speed-responsive means co-operatively controlling the operation of the motor, electric generating means operated by the prime mover, a plurality of constant-potential conductors, one terminal of the electric generating means being directly connected to one of said conductors, the other terminal of the electric generating means being connected through the electromagnetic speed responsive means to the other conductor.

In testimony whereof we have hereunto subscribed our names this 17th day of September, 1923.

WILLIAM M. BRADSHAW.
JOHN H. ASHBAUGH.